3,154,515
FLAME RETARDANT COMPOSITIONS
Charles A. Berridge, Cohoes, N.Y., assignor to General
Electric Company, a corporation of New York
No Drawing. Filed Nov. 23, 1960, Ser. No. 71,118
9 Claims. (Cl. 260—33.8)

This invention relates to organopolysiloxane compositions convertible to the cured, solid, elastic state at room temperature, which compositions in the cured state exhibit improved flame retardancy over prior art materials. More particularly, the present invention relates to an organopolysiloxane composition convertible at room temperature, for instance at temperatures ranging from about 20° C. to 40° C., to the cured, solid, elastic state, said composition comprising (A) a linear fluid methylpolysiloxane containing terminal silicon-bonded hydroxy groups and having an average of about 2 methyl groups per silicon atom, (B) an organic silicate and (C) a metallic salt of an organic carboxylic acid in which the metallic ion is selected from the class consisting of lead, tin, zirconium, antimony, iron, cadmium, barium, calcium, titanium, bismuth and manganese, (D) a chlorinated polyphenyl and (E) a finely divided cupreous material selected from the class consisting of copper, copper oxides, copper halides and mixtures of the aforesaid cupreous materials.

In the past, room temperature curing or room temperature vulcanizing organopolysiloxanes have been known in the art and many examples of such materials are shown in Patent 2,843,555, Berridge. While the room temperature curing organopolysiloxanes of the type described by the Berridge patent are extremely useful in most applications, it has been found that the room temperature curing organopolysiloxanes prepared from linear fluid methylpolysiloxanes of the type described above fail to exhibit the desired degree of flame retardancy. Thus, when these materials are ignited in a flame, they continue to burn for an undue period of time and an unacceptably large portion of the room temperature vulcanizing silicone is consumed in the burning process.

The present invention is based on my discovery of a unique combination of additives to the room temperature curing organopolysiloxanes of the type described above which markedly reduces the burning time and percent consumed of such compositions. This combination of flame retardancy additives consists of a chlorinated polyphenyl or mixture of chlorinated polyphenyls and a finely divided cupreous compound selected from the class consisting of copper, copper oxides, copper halides, and mixtures of the aforesaid cupreous materials.

The completely unexpected feature of my invention is the fact that while the chlorinated polyphenyl materials will improve the flame retardancy of these particular room temperature curing organopolysiloxanes to some extent, the cupreous compounds when used alone have no detectable effect on improving the flame retardancy. However, the combination of both the chlorinated polyphenyls and the cupreous compound exhibits a marked effect on improvement of this property, the improvement being far greater than the improvement observed when the chlorinated polyphenyls alone are employed as flame retardancy additives.

Linear fluid methylpolysiloxanes containing terminal silicon-bonded hydroxy groups and having an average of about 2 methyl groups per silicon atom are well known in the art and can be prepared, for example, by starting with cyclic dimethylpolysiloxanes having the formula:

(1)     $[(CH_3)_2SiO]_n$ where $n$ is an integer equal to at least 3, for example, from about 3 to 10 or more. Among the preferred cyclic dimethylpolysiloxanes employed as starting materials can be mentioned, for example, hexamethylcyclotrisiloxane, octamethylcyclotetrasiloxane and decamethylcyclopentasiloxane as well as mixtures of these three cyclic dimethylpolysiloxanes alone or with higher cyclopolysiloxanes.

In preparing the linear fluid dimethylpolysiloxane containing terminal silicon-bonded hydroxy groups, the starting cyclic dimethylpolysiloxanes are advantageously heated at temperatures of about 125° to 150° C. with small amounts of a siloxane rearrangement and condensation catalyst (about 0.001 to 0.01 percent by weight, based on the weight of the cyclic organopolysiloxane), such as potassium hydroxy, tetrabutylphosphonium hydroxide, etc. The temperature and time at which this heating will take place will vary depending upon such factors as the particular cyclic dimethylpolysiloxane employed, the siloxane rearrangement and condensation catalyst employed, the concentration of catalyst, the desired viscosity, etc. In general, the polymerization is carried out for a time sufficient to obtain a high molecular weight product of about 150,000 to 2,000,000 centipoise viscosity when measured at 25° C. Generally, this product is obtained in a time which varies from a few minutes to 4 to 6 or more hours, depending on the reactants and reaction conditions.

The high molecular weight product thus obtained is then treated with water to reduce its viscosity to a viscosity of from about 1,000 to 100,000 centipoises at 25° C. This can be accomplished by blowing steam across the surface of the high molecular weight product for a sufficient time to give the lower viscosity material (about 1,000 to 100,000 centipoises) having terminal silicon-bonded hydroxy groups. Instead of blowing steam across the surface of the high molecular weight product, the steam may also be forced through the product. The resulting linear fluid organopolysiloxane containing terminal silicon-bonded hydroxy groups will have the general formula:

(2) 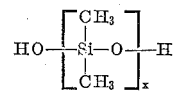

where $x$ is a whole number greater than 1, e.g., from 2 to 100 or more. Such compositions and methods for preparing the same are more particularly described in U.S. Patent 2,607,792, Warrick. The use of steam in this fashion causes a decrease in the viscosity of the high molecular weight product at the same time forming linear polysiloxanes having the terminal silicon-bonded hydroxy groups.

An alternative method for making the linear fluid dimethylpolysiloxanes containing terminal silicon-bonded hydroxy groups comprises adding water to the high molecular weight polymer described above in such amount that when heated at elevated temperatures, for instance at 150° to 170° C., the viscosity is reduced to the desired level of 1,000 to 100,000 centipoises. The amount of water used will vary depending upon such factors as the molecular weight of the polymer being treated, the time and temperature at which the polymer being treated will be heated, the ultimate viscosity desired, etc. The amount of water used to reduce the molecular weight can be readily determined. For example, a linear fluid dimethylpolysiloxane containing terminal silicon-bonded hydroxyl groups and having a viscosity of from 1,000 to 2,000 centipoises can be obtained by heating a high molecular weight dimethylpolysiloxane prepared in accordance with the directions above, of about 2,000,000 centipoise viscosity, with 0.5% by weight of water for about 2 hours at 150° to 170° C.

The organo silicates used in the practice of the present invention are also well known in the art and are selected from the class consisting of (1) monomeric organosilicates corresponding to the general formula:

(3)

and (2) liquid partial hydrolysis products of the aforementioned monomeric organo silicates where R is a member selected from the class consisting of alkyl radicals and halogenated alkyl radicals, and R' is a member selected from the class consisting of alkyl radicals, aryl radicals, aralkyl radicals, alkaryl radicals, alkoxy radicals, aryloxy radicals and halogenated derivatives of the aforesaid alkyl, aryl, aralkyl, alkaryl, alkoxy and aryloxy radicals.

Included within the radicals represented by R and R' in Formula 3 can be mentioned, for example, methyl, ethyl, propyl, isopropyl, butyl, amyl, isoamyl, octyl, iso-octyl, decyl, dodecyl, beta-chloroethyl, etc. radicals. Also included within the radicals represented by R' can be mentioned, for example, ethoxy, propoxy, butoxy, nonoxy, phenyl, tolyl, xylyl, benzyl, phenylethyl, naphthyl, anthracyl, biphenyl, phenoxy, p-bromophenoxy, beta-chloroethoxy, etc. radicals. The halogens, for example chlorine, bromine, etc., may be attached to any position in the alkyl group or the aryl group and may comprise any number of halogens. When halogen is attached to an alkyl group, in either the R or the R' radical, it is preferred that the halogen be attached to a carbon atom other than an alpha carbon atom in order to attain improved stability of such halogen-substituted alkyl groups.

Illustrative of monomeric alkyl silicates I prefer to use are compounds corresponding to the general formula:

(4)                        $(RO)_4Si$ where R is an alkyl group as defined above. In addition to employing the liquid monomeric organic silicates described above in the practice of the present invention, I can, as described above, also use liquid partially hydrolyzed products derived therefrom. Such hydrolysis products are generally obtained by effecting partial hydrolysis in water of the particular monomeric organosilicate in the presence of small amounts of acid to a point where it is still water insoluble and it is still possible to isolate a liquid, partially hydrolyzed organosilicon compound. Thus, taking as a specific example a controlled partial hydrolysis of ethylorthosilicate, the hydrolysis of the latter may be carried out by adding acids or acid-forming metal salts to the liquid monomeric orthosilicate, for instance, ferric chloride, cupric chloride, aluminum chloride, stannic chloride, etc., and thereafter effecting suitable hydrolysis of this mixture of ingredients in water to obtain the two-phase composition from which the water insoluble, partially hydrolyzed alkyl silicate can be readily separated from the aqueous phase and catalyst.

As described in the aforementioned Berridge patent, organic carboxylic acid salts of only certain metals are satisfactory to give room temperature curing characteristics to materials of the type involved in the present invention. The metals from which the salts are derived are selected from the class consisting of lead, tin, zirconium, antimony, iron, cadmium, barium, calcium, titanium, bismuth and manganese. Suitable acid radicals are those yielding the resinate, linoleate, stearate, oleate or lower acid radicals such as those yielding the acetate, the butyrate, the octoate, etc. Examples of operable salts include, for example, tin naphthenate, lead octoate, tin octoate, iron stearate, tin oleate, antimony octoate, tin butyrate, dibutyl tin dilaurate, etc.

The chlorinated polyphenyls employed in the practice of the present invention are well known in the art. These materials comprise groupings of two or more benzene nuclei which are chlorinated to varying degrees. The best known of these chlorinated polyphenyls comprise chlorinated biphenyls, chlorinated terphenyls, mixtures of chlorinated biphenyls and chlorinated terphenyls, as well as mixtures of chlorinated terphenyls and chlorinated biphenyls with chlorinated higher polyphenyls. The degree of chlorination required for the chlorinated polyphenyls within the scope of the present invention is such that the final product contains an average of from about 40 to 80 percent by weight chlorine, based on the total weight of the chlorinated polyphenyls.

These materials are described in a number of places in the literature. For example, chlorinated biphenyl (chlorinated phenylbenzene) is described in Patent, 1,887,678, Gardner. The physical state of the chlorinated biphenyl depends to a large extent of the chlorine content which can range from about 40 to 80 percent by weight of the chlorinated biphenyl. With chlorine contents below about 60 percent by weight, oily materials are obtained. With chlorine contents greater than about 60 percent, the chlorinated biphenyls are usually solid masses. One chlorinated biphenyl which is particularly useful in the composition of the present invention is the light viscous oil sold commercially under the name Aroclor 1254.

Chlorinated terphenyls are described, for example, in Patent 2,551,562, Jenkins. The chlorinated terphenyls (chlorinated diphenylbenzene) which can be employed in the practice of the present invention are generally prepared by chlorination of any of the isomeric diphenylbenzenes or mixtures of such isomers. These materials also have chlorine contents of from about 40 to 80 percent and are all relatively hard, solid materials. A particularly useful chlorinated terphenyl for purposes of the present invention is the product sold as Aroclor 5460

In general, the physical state of the various chlorinated polyphenyls is a function of both the number of phenyl nuclei in the polyphenyl and the percent chlorine. As the percent chlorine increases, the state of the material changes from oily to solid. Similarly as the number of phenyl nuclei increases, the material becomes harder.

The cupreous material employed in the practice of the present invention are generally those commercially available. The cupreous powder is generally employed in the finely divided state and preferably has an average particle size of only a few microns. For optimum results, from 95 to 100 percent of the particles should pass through a 325 mesh screen when measured by the United States Standard Sieve series. When thus passing through the 325 mesh sieve, the average particle size expressed in microns is less than 44 microns.

In addition to the copper powder which must, for optimum results, have the particle size recited above, the cupreous material may consist of friable metallic copper core particles surrounded by a protective surface film of cuprous oxide, said film being relatively thin as compared with the size of the enclosed copper cores, the amount of cuprous oxide on the copper particle pores being at least sufficient to be identified by present X-ray diffraction methods. This particular cupreous mixture of copper and copper oxides employed in the practice of the present invention and the methods of preparing the same are more specifically disclosed in Patent 2,420,540, Hubbell.

Generally, it is desirable that the cupreous material, whether it be copper powder, cupric oxide, cuprous chloride or cupric chloride, be employed in the finely divided state and for this purpose it is desirable to use a cupreous material having an average particle size below about 15 microns. Although somewhat coarser particles of a larger average particle size can be employed, it is generally desirable to keep the particle size as fine as possible in order to avoid any adverse effects on the physical properties such as tensile strength, elongation and tear strength of the room temperature cured organopolysiloxane.

Various fillers can be incorporated into the room temperature curing, flame retardant composition of the present invention. Among such fillers are, for example, titanium dioxide, lithophone, zinc oxide, zirconium silicate, silica aerogel, iron oxide, diatomaceous earth, calcium carbonate, fumed silica, precipitated silica, finely divided glass fibers, etc.

In preparing the flame-retardant, room temperature curing organopolysiloxane compositions of the present invention, it is only necessary to mix the ingredients thoroughly, without particular regard to the order in which the ingredients are added except with respect to the metallic salt. Since the compositions of the present invention are curable at room temperature, cure of the compostiions will begin as soon as the metal salt catalyst is added to the composition. Accordingly, it is preferred to mix all of the ingredients thoroughly and add the metal salt only at the time at which the composition is to be converted to the cured, solid elastic state. Thus, preferably all of the ingredients except the metallic-salt catalyst are thoroughly mixed and the metallic salt is kept separate until the material is to be applied or used. Within a matter of a few minutes after addition of the metal salt catalyst to the composition, the composition, which initially is in a semi-fluid state, will begin to set up. Within 3 minutes to 8 hours the material will set up to its final cured, elastic form with complete cure of the composition being effected within about 24 to 48 hours of the time at which the metallic salt catalyst is added.

The proportions of the various ingredients in the flame retardant room temperature curing organopolysiloxane elastomer of the present invention can vary within very wide limits. However, for optimum flame retardancy in combination with desirable physical properties, I employ on the basis of 100 parts of the linear fluid dimethylpolysiloxane containing terminal silicon-bonded hydroxy groups from 0.1 to 10, and preferably from 1 to 5, parts by weight of orangic silicate; from 10 to 300, and preferably 20 to 100, parts by weight filler where filler is employed; from 1 to 25, and preferably 5 to 15, parts by weight of the chlorinated polyphenyl; and from 0.25 to 20, and preferably 0.5 to 10, parts by weight of the cupreous compound. When the metallic salt catalyst is employed as a curing agent for the aforementioned compositions, the catalyst is added in an amount equal to from 0.1 to 5 parts by weight salt per 100 parts of the linear fluid dimethylpolysiloxane.

The following examples are illustrative of the practice of my invention and are not intended for purposes of limitation. All parts are by weight.

In order to evaluate the flame retardant properties of the room temperature curing organopolysiloxanes described in the examples, a test was employed which consisted of suspending a cured strip of the silicone elastomer having dimensions of 0.25 inch by 6 inches by 0.80 inch in a glass chimney in a draft-free atmosphere over a blue flame (approximately 2,000° F.) in such a manner that the tip of this strip is suspended 1 inch into the flame. The strip is held in the flame for a period of 20 seconds, at which time the flame is removed and the time required for the flame to become completely extinguished is measured. This time is recorded as the "burn out time" in seconds. The test strip is then freed of loose ash and weighed to determine the "percent consumed" by the fire.

EXAMPLE 1

A number of room temperature curing silicone rubber formulations were prepared, each of which contained 100 parts of a silanol chain-stopped dimethylpolysiloxane having a viscosity of about 3500 centistokes at 25° C., 65 parts of finely divided red iron oxide, 25 parts of diatomaceous earth and 3 parts of a partially hydrolyzed ethylsilicate which has about 40 percent available silica and is derived from the controlled hydrolysis of tetraethylsilicate. This material is actually a mixture of ethylpolysilicates derived from the controlled hydrolysis of tetraethylsilicate and contains an average of 4 silicon atoms per molecule.

To each of these mixtures described above were added controlled amounts of a finely divided black cupric oxide and varying amounts of a chlorinated biphenyl having an average of 68 percent by weight chlorine. To each of the resulting formulations was added 0.26 part of dibutyl tin dilaurate as a curing catalyst and each mixture was rapidly stirred to provide a uniform mixture. At the end of about 30 minutes, each of the mixtures had set to a tack-free solid elastic state. At the end of 24 hours the flame retardancy of each sheet was measured as described above. In Table I below are listed the parts of the chlorinated biphenyl and the parts of cupric oxide added and the burn out time and percent consumed in the flame test.

*Table I*

| Formulation | A | B | C | D | E | F | G |
|---|---|---|---|---|---|---|---|
| Chlorinated Biphenyl | 0 | 2.6 | 5.2 | 7.8 | 0 | 0 | 7.8 |
| Cupric Oxide | 0 | 0 | 0 | 0 | 0.26 | 2.6 | 0.26 |
| Burn Out Time, Sec | 155 | 145 | 120 | 125 | 170 | 212 | 37 |
| Percent Consumed | 71 | 52 | 36 | 21 | 85 | 75 | 5.2 |

As shown in Table I, formulation A, which was a control and contained neither the chlorinated biphenyl nor the cupric oxide, exhibited a burn out time of 155 seconds and 71 percent of the test was consumed. In contrast to this, formulations B, C and D, which contained increasing amounts of the chlorinated biphenyl and no cupric oxide, showed a decreasing burn out time and a decreasing percent consumed. However, even with 7.8 parts of chlorinated biphenyl per 100 parts of the silanol chain-stopped dimethylpolysiloxane fluid (formulation D), the burn out time was still 125 seconds and 21 percent was consumed. Formulations E and F show the addition of varying amounts of cupric oxide but no chlorinated biphenyl to these compositions. As shown, the cupric oxide alone fails to improve either the burn out time or the percent consumed over the control. In fact, the cupric oxide-containing formulations E and F are actually inferior to the control. In contrast to these data, when both chlorinated biphenyl and cupric oxide were added to the formulations (formulation G) both the burn out time and the percent consumed were drastically reduced.

EXAMPLE 2

Two formulations were prepared which correspond to formulations D and G of Example 1, except that the chlorinated biphenyl of Example 1 was replaced with a chlorinated biphenyl containing 54 percent by weight chlorine. Thus, the first of these formulations contained a chlorinated biphenyl as an additive and the second formulation contained both the chlorinated biphenyl and cupric oxide. After catalyzation of each of these two formulations by the method of Example 1 and curing at room temperature for 24 hours, the flame retardancies were measured. The first formulation exhibited a burn out time of 50 seconds and 17.5 percent of the material was consumed. In contrast to this, the second formulation, which contained both the chlorinated biphenyl and the cupric oxide, exhibited a burn out time of 35 seconds and only 9.2 percent of the test sample was consumed.

EXAMPLE 3

Two formulations identical to formulations D and G Example 1 were prepared with the chlorinated biphenyl of Example 1 replaced with a chlorinated biphenyl containing 48 percent by weight chlorine. The first formulation, which contained the chlorinated biphenyl only, had a burn out time of 65 seconds and 18.9 percent consumed while the second formulation, which contained both the chlorinated biphenyl and the cupric oxide, had a burn out time of 50 seconds and only 8.1 percent of the test sample was consumed.

EXAMPLE 4

A room temperature curable formulation was prepared by mixing 100 parts of a silanol chain-stopped dimethylpolysiloxane having a viscosity of about 2,000 centipoises at 25° C., 20 parts diatomaceous earth, 20 parts zinc oxide and 30 parts calcined clay. To this mixture of ingredients was added 2 parts of the partial hydrolysis product of ethylorthosilicate mentioned above. This material was divided into three parts and to the first part was added 2 parts per 100 parts of the dimethylpolysiloxane of a solution of tin octoate in mineral spirits containing 6 percent by weight tin. To a second part was added the same proportion of tin octoate and 20 parts per 100 parts of the dimethylpolysiloxane of a chlorinated polyphenyl comprising a mixture of chlorinated diphenyls, chlorinated terphenyls and chlorinated higher polyphenyls and containing an average of about 48 percent by weight chlorine. To a third part was added the same proportion of tin octoate and the same proportion of the chlorinated polyphenyl as well as 5 parts per 100 parts of the dimethylpolysiloxane of finely divided copper. After allowing each of these materials to cure at room temperature for 24 hours to a solid, elastic material, the flame retardancy of each material was measured. The flame retardancy of the first material, which contained neither the chlorinated biphenyl nor the copper powder, is illustrated by a burn out time of over 125 seconds with about 25 percent of the material being consumed. For the material containing the chlorinated polyphenyl, the burn out time was reduced to about 75 seconds and the percent consumed was reduced to about 20 percent. For the material containing both the chlorinated polyphenyl and the copper powder, the burn out time was reduced to about 40 seconds and the percent consumed was reduced to about 10 percent.

EXAMPLE 5

A composition was prepared by mixing 100 parts of a silanol chain-stopped dimethylpolysiloxane having a viscosity of about 70,000 centistokes at 25° C., 50 parts of finely divided synthetic calcium carbonate, 4 parts of ethylorthosilicate, 10 parts of a chlorinated terphenyl containing an average of 60 percent by weight chlorine, 5 parts lead naphthenate and 2 parts cupric chloride. After thoroughly mixing these ingredients and allowing the mixture to cure at room temperature for 24 hours, the flame retardancy was measured. This material exhibited a burn out time of less than 35 seconds and less than 10 percent of the sample was consumed. This material had a Shore A hardness of about 60, a tensile strength of about 700 p.s.i. and an elongation at break of about 150 percent.

The flame retardant elastomeric materials of the present invention have many applications. In general, the applications of these materials are identical to those applications recited in Patent 2,843,555, Berridge. Thus, these materials may be employed as dental impression compounds for the encapsulation of electrical and electronic components, for caulking materials and the like and are particularly useful in those applications in which the compositions might come into contact with flame. In these last mentioned applications, the flame-retardant characteristics of the compositions of the present invention make them especially useful.

What I claim as new and desire to secure by Letters Patent of the United States is:

1. A composition curable to the cured, flame retardant solid, elastic state comprising a mixture of, by weight, (A) 100 parts of a linear fluid dimethylpolysiloxane containing terminal silicon-bonded hydroxy groups convertible to the cured, solid, elastic state and having the formula

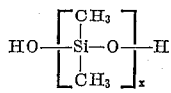

where $x$ is a whole number greater than 1, (B) from 0.1 to 10 parts of an organic silicate selected from the class consisting of (1) monomeric organosilicates corresponding to the general formula:

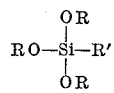

where R and R' are members selected from the class consisting of alkyl groups and halogen-substituted alkyl groups and R', in addition, represents a member selected from the class consisting of aryl, aralkyl, alkaryl, alkoxy, aryloxy groups and halogenated derivatives of the aforesaid aryl, aralkyl, alkaryl, alkoxy and aryloxy groups and (2) liquid partial hydrolysis products of the aforementioned monomeric organosilicates, (C) from 1 to 25 parts of a chlorinated polyphenyl, and (D) from 0.25 to 20 parts of a finely divided cupreous material selected from the class consisting of copper, copper oxides, copper halides, and mixtures of the aforesaid cupreous materials.

2. A composition curable to the flame retardant, solid, elastic state comprising a mixture of, by weight, (A) 100 parts of a linear fluid dimethylpolysiloxane containing terminal silicon-bonded hydroxy groups and convertible to the cured, solid, elastic state and having the formula:

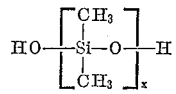

where $x$ is a whole number greater than 1, (B) from 0.1 to 10 parts of an organic silicate selected from the class consisting of (1) monomeric organosilicates corresponding to the general formula:

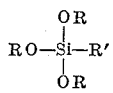

where R and R' are members selected from the class consisting of alkyl groups and halogen-substituted alkyl groups and R', in addition, represents a member selected from the class consisting of aryl, aralkyl, alkaryl, alkoxy and aryloxy groups and halogenated derivatives of the aforesaid aryl, aralkyl, alkaryl, alkoxy and aryloxy groups and (2) liquid partial hydrolysis products of the aforementioned monomeric organosilicates, (C) from 1 to 25 parts of a chlorinated polyphenyl, (D) from 0.25 to 20 parts of a finely divided cupreous material selected from the class consisting of copper, copper oxides, copper halides and mixtures of the aforesaid cupreous materials, and (E) a filler.

3. The composition of claim 2 in which the organosilicate is a polyethylsilicate.

4. The composition of claim 2 in which the chlorinated polyphenyl is a chlorinated biphenyl.

5. The composition of claim 2 in which the chlorinated polyphenyl is a chlorinated terphenyl.

6. The process of claim 9 in which the metallic salt is a tin salt.

7. The process of claim 9 in which the metallic salt is dibutyl tin dilaurate.

8. The process of claim 9 in which the metallic salt is a lead salt.

9. The process for making a composition of matter which can be converted at room temperature to the flame retardant, cured, solid, elastic state which process comprises forming a mixture of ingredients comprising, by weight, (A) 100 parts of a linear fluid dimethylpolysiloxane containing terminal silicon-bonded hydroxy groups and convertible to the cured, solid, elastic state and having the formula:

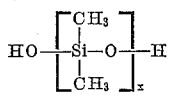

where $x$ is a whole number greater than 1, (B) from 0.1 to 10 parts of an organic silicate selected from the class consisting of (1) monomeric organosilicates corresponding to the general formula:

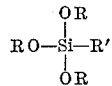

where R and R' are members selected from the class consisting of alkyl groups and halogen-substituted alkyl groups and R', in addition, represents a member selected from the class consisting of aryl, aralkyl, alkaryl, alkoxy and aryloxy groups and halogenated derivatives of the aforesaid aryl, aralkyl, alkaryl, alkoxy and aryloxy groups and (2) liquid partial hydrolysis products of the aforementioned monomeric organosilicates, (C) from 1 to 25 parts of a chlorinated polyphenyl, (D) from 0.25 to 20 parts of a cupreous material selected from the class consisting of copper, copper oxides, copper halides and mixtures of the aforesaid cupreous materials, (E) a filler, and (F) from 0.1 to 5 parts of a metallic salt of an organic monocarboxylic acid in which the metal ion is selected from the class consisting of lead, tin, zirconium, antimony, iron, cadmium, barium, calcium, titanium, bismuth and manganese, and thereafter allowing the mixture to cure at room temperature.

References Cited in the file of this patent
UNITED STATES PATENTS

| | | |
|---|---|---|
| 2,335,097 | Aken | Nov. 23, 1943 |
| 2,590,211 | Rugar | Mar. 25, 1952 |
| 2,610,920 | Hopkinson | Sept. 16, 1952 |
| 2,843,555 | Berridge | July 15, 1958 |
| 2,891,033 | Savage | June 16, 1959 |